(12) United States Patent
Phillips et al.

(10) Patent No.: US 8,020,528 B1
(45) Date of Patent: Sep. 20, 2011

(54) COUNTERWEIGHT SHAFT CONSTRUCTION WHICH REDUCES AERATION WHEN SUBMERGED OR PARTIALLY SUBMERGED BELOW THE SURFACE OF A LIQUID

(75) Inventors: George E. Phillips, Oshkosh, WI (US); Wayne M. Jaszewski, Jackson, WI (US)

(73) Assignee: Brunswick Corporation, Lake Forest, IL (US)

( * ) Notice: Subject to any disclaimer, the term of this patent is extended or adjusted under 35 U.S.C. 154(b) by 734 days.

(21) Appl. No.: 12/174,325

(22) Filed: Jul. 16, 2008

Related U.S. Application Data

(63) Continuation-in-part of application No. 11/949,425, filed on Dec. 3, 2007, now Pat. No. 7,617,810.

(51) Int. Cl.
*F02B 75/06* (2006.01)

(52) U.S. Cl. .............. 123/192.2; 123/192.1; 123/198 E; 123/196 R; 74/603; 74/604

(58) Field of Classification Search ............... 123/192.1, 123/192.2, 198 E, 196 R; 74/603, 604, 579 R, 74/590, 589; 464/180
See application file for complete search history.

(56) References Cited

U.S. PATENT DOCUMENTS

| | | | |
|---|---|---|---|
| 4,508,069 A | | 4/1985 | Dobler et al. |
| 5,401,199 A | | 3/1995 | Shibata |
| 5,535,643 A | * | 7/1996 | Garza ............................ 74/603 |
| 5,850,764 A | | 12/1998 | Bostelmann et al. |
| 5,893,346 A | | 4/1999 | Hosoya |
| 5,901,679 A | * | 5/1999 | Tanaka et al. ............. 123/195 C |
| 6,186,111 B1 | | 2/2001 | Hilbig et al. |
| 6,189,499 B1 | | 2/2001 | Iwata et al. |
| 6,601,557 B1 | | 8/2003 | Hayman et al. |
| 6,708,663 B1 | | 3/2004 | Stuckler |
| 7,201,622 B2 | | 4/2007 | Hoi |
| 7,341,039 B1 | | 3/2008 | Jaszewski et al. |

FOREIGN PATENT DOCUMENTS

JP 410331715 A * 12/1998

* cited by examiner

*Primary Examiner* — Michael Cuff
*Assistant Examiner* — Hung Q Nguyen
(74) *Attorney, Agent, or Firm* — William D. Lanyi

(57) ABSTRACT

An engine structure is provided with a bedplate and an oil pan. The bedplate is configured to have an integrally formed balance shaft bearing support. A bearing cap is either a separate component or a component that is formed as an integral part of the oil pan. The bearing cap and the balance shaft bearing support structures are attachable to each other to capture the bearing portions of the balance shafts therebetween.

20 Claims, 11 Drawing Sheets

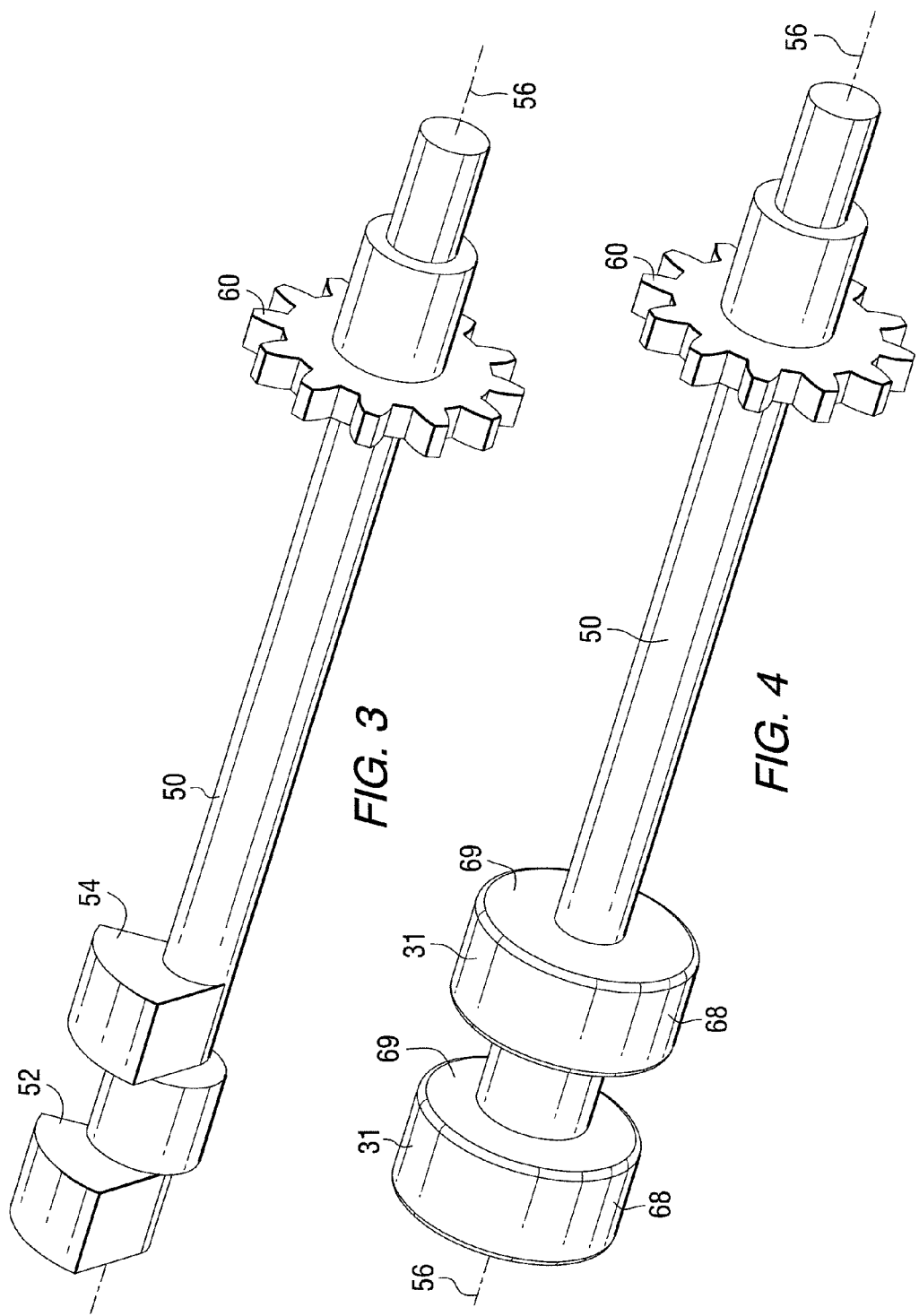

COUNTERWEIGHT SHAFT CONSTRUCTION WHICH REDUCES AERATION WHEN SUBMERGED OR PARTIALLY SUBMERGED BELOW THE SURFACE OF A LIQUID

CROSS REFERENCE TO RELATED APPLICATIONS

This application is a continuation-in-part of U.S. patent application Ser. No. 11/949,425 filed on Dec. 3, 2007 now U.S. Pat. No. 7,617,810.

BACKGROUND OF THE INVENTION

1. Field of the Invention

The present invention is generally related to a shaft of an engine having a counterweight and a housing structure disposed at least partially around the counterweight and, more particularly, to a balance shaft support structure of which portions are formed integrally with housing structures of the crankcase and/or oil pan.

2. Description of the Related Art

Many different products are known in which a shaft of some type is provided with an overmolded structure which encapsulates the shaft.

U.S. Pat. No. 4,508,069, which issued to Dobler et al. on Apr. 2, 1985, describes an internal combustion engine balance shaft bearing arrangement at a crankcase. The arrangement for the balance shafts for balancing second order inertia forces on an internal combustion engine is described. The shafts run parallel to the crankshaft on both longitudinal walls of a crankcase and have the ends carrying the balance weights supported by means of journal bearings within the crankcase and having driven ends supported by means of roller bearings outside the crankcase in the region of a crankcase end wall.

U.S. Pat. No. 5,401,199, which issued to Shibata on Mar. 28, 1995, describes an outboard motor engine. Two embodiments of balancer arrangements for internal combustion engines particularly adapted for use in outboard motors are described. In each embodiment, the balancer shaft is journaled within the crankcase chamber of the engine and is driven from the crankcase from a point between its ends. Single and twin balancer shaft arrangements are disclosed.

U.S. Pat. No. 5,850,764, which issued to Bostelmann et al. on Dec. 22, 1998, describes a crankshaft drive for an internal combustion engine. It comprises at least one cylinder having a cylinder head, and a crankcase housing a crankshaft rotating at a predetermined direction and at a predetermined speed and a balance shaft extending parallel to the crankshaft and rotating at the predetermined speed of the crankshaft in a direction opposite to the predetermined rotating direction of the crankshaft. The crankshaft and the balance shaft carry balance weight means for balancing a mass of first order. An auxiliary shaft extends parallel to the crankshaft and rotates at the predetermined speed of the crankshaft in the predetermined rotating direction of the crankshaft. The auxiliary shaft carries a counterweight for balancing a residual moment resulting from the rotating balance shaft with respect to the rotating crank shaft.

U.S. Pat. No. 5,893,346, which issued to Hosoya on Apr. 13, 1999, describes an engine balance shaft. A mounting arrangement for a balance shaft of a four cycle overhead cam shaft internal combustion engine is described wherein the balance shaft is driven from the crankshaft and is disposed within the crankcase chamber and is disposed below the axis of rotation of the crankshaft. The balance shaft is driven from an end of the crankshaft and is journalled at least in part by a detachable crankshaft journaling member.

U.S. Pat. No. 6,186,111, which issued to Hilbig et al. on Feb. 13, 2001, describes a support arrangement for the crankcase of a reciprocating piston internal combustion engine. The support arrangement for the open area of a crankcase facing an oil pan in an internal combustion engine has a plate-like component which is attached to the crankcase walls by lugs, thereby reinforcing the housing, and contains integral bearings rotatably supporting a balance shaft.

U.S. Pat. No. 6,189,499, which issued to Iwata et al. on Feb. 20, 2001, describes a balancing device for a reciprocating engine. There is provided a balancing device for a reciprocating engine comprising two balance shafts gear connected to each other, a chain/sprocket mechanism for coupling at least one of the balance shafts with a crankshaft in an interlocking fashion, a chain tensioner for automatically adjusting the tension of the chain and a pump receiving portion integrally provided in a balance shaft holder for supporting the balance shafts for receiving a rotor of a lubricating oil pump.

U.S. Pat. No. 6,601,557, which issued to Hayman et al. on Aug. 5, 2003, describes an engine oil pump and balance shaft module. It includes a housing supporting a rotatable balance shaft carrying at opposite ends balance weights for offsetting unbalanced forces of the engine. The balance weights are enclosed in open top enclosures from which oil is pumped by veins on the weights and an associated gear, driven by the engine crankshaft.

U.S. Pat. No. 6,708,663, which issued to Stuckler on Mar. 23, 2004, describes a device for balancing out mass forces in internal combustion engines. The device compensates the inertia forces in reciprocating piston machines and consists of a balance shaft housing and balance weights mounted in the latter in friction bearings and having compensating weights. The balance shaft housing is fastened in one part and to the engine block.

U.S. Pat. No. 7,201,622, which issued to Hoi on Apr. 10, 2007, describes an internal combustion engine including improved balance shaft structure. An internal combustion engine is provided for a personal watercraft. A portion of the engine is enlarged to accommodate a balance shaft and is minimized in size, whereby the internal combustion engine is made compact. Balance shafts for preventing secondary vibration are arranged together with a crankshaft on a dividing plane between a crankcase and a cylinder block of an internal combustion engine.

U.S. Pat. No. 7,341,039, which issued to Jaszewski et al. on Mar. 11, 2008, discloses a lubrication system for a marine propulsion system with a tilted in-line engine. The lubrication system for an in-line engine which has a piston symmetry plane that is tilted relative to the vertical plane is provided with an oil pan and windage tray that facilitates the transfer of oil from a rotating crankshaft to the oil pan without excessive aeration. In addition, it facilitates the removal of entrained air from liquid oil as it passes from the crankshaft to a pool of oil collected in an oil pan. A windage tray is provided with a louver structure and a louver opening structure that assists this passage of oil droplets without undue aeration being caused.

The patents described above are hereby expressly incorporated by reference in the description of the present invention.

It would be significantly beneficial if balance shafts could be effectively supported with a minimal amount of hardware required. It would also be beneficial if the balance shafts could be efficiently enclosed within a housing structure below or adjacent to an engine. A significant improvement could be provided if the weight of the overall engine structure, with its balance shaft support components, could be reduced. Additionally, it would be beneficial if the overall number of components could be reduced so that assembly costs are minimized.

SUMMARY OF THE INVENTION

An internal combustion engine made in accordance with a preferred embodiment of the present invention comprises a bed plate attached to an engine to define a first cavity, a crankshaft of the engine disposed within the first cavity, an oil pan attached to the bedplate to define a second cavity, a balance shaft bearing support formed as integral part of the bedplate, and a first balance shaft disposed within the second cavity and supported by the balance shaft bearing support for rotation about a first axis, a second balance shaft disposed within the second cavity and supported by the balance shaft bearing support for rotation about a second axis, and a bearing cap which is attachable to the balance shaft bearing support to capture portions of the first and second balance shafts therebetween. The oil pan is suspended below the bedplate in a preferred embodiment of the present invention and the first and second axes are generally horizontal.

In particular embodiments of the present invention, the bearing cap is formed as an integral part of the oil pan and is attached to the balance shaft bearing support. In alternative embodiments of the present invention, the bearing cap is a component which is separate from the oil pan and is attachable to the balance shaft bearing support. In some embodiments of the present invention, it further comprises a crankshaft bearing support formed as an integral part of the bedplate and disposed within the first cavity. The crankshaft is supported by the crankshaft bearing support.

BRIEF DESCRIPTION OF THE DRAWINGS

The present invention will be more fully and completely understood from a reading of the description of the preferred embodiment in conjunction with the drawings, in which:

FIG. 3 illustrates a balance shaft that can be used in accordance with a preferred embodiment of the present invention;

FIG. 4 illustrates a preferred embodiment of the present invention which overmolds the counterweights of the balance shaft with a polymer material;

DESCRIPTION OF THE PREFERRED EMBODIMENT

Figure 1:
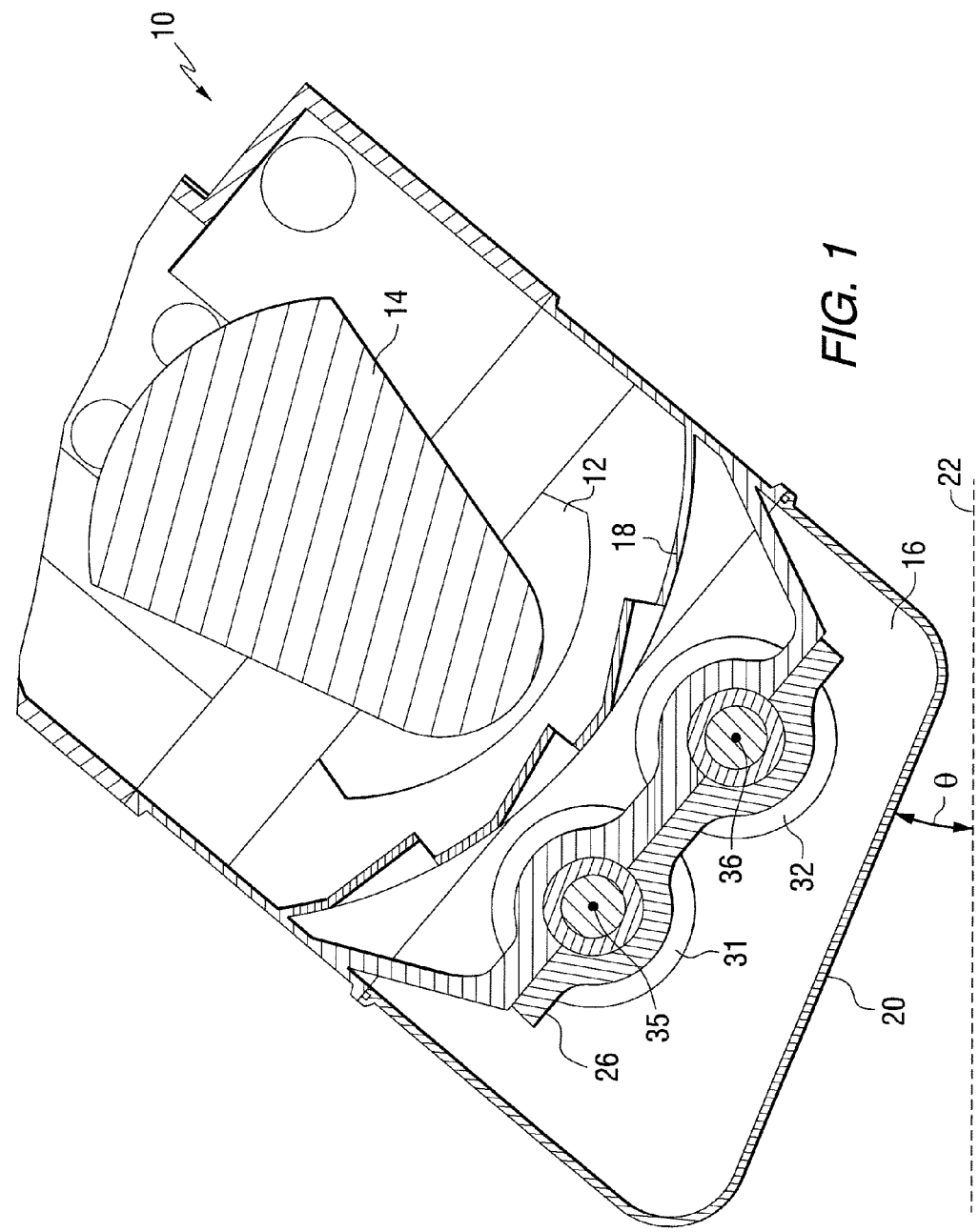
FIGS. 1 and 2 are section views of an engine structure showing the relative locations of balance shafts to other components of the engine.

Throughout the description of the preferred embodiment of the present invention, like components will be identified by like reference numerals.

FIG. 1 shows the lower part of an engine structure including a crankshaft counterweight 12 which is not shown in section view and a second crankshaft counterweight 14 which is shown in section view. An oil reservoir portion 16 is located at a lower portion of the engine and is separated from the crankshaft by a louvered member 18. The lower surface 20 of the crankcase is disposed at an angle θ from a horizontal line 22. Although the engine 10 shown in FIG. 1 is tilted so that the movement of the reciprocating pistons is in a plane that is at an angle from the horizontal line 22, this specific characteristic of the engine is not directly related to all applications of the basic concepts of the present invention.

With continued reference to FIG. 1, it can be seen that in the oil reservoir 16, a support structure 26 is provided to support two balance shafts, 31 and 32, for rotation about their respective axes, 35 and 36. Although not shown in FIG. 1, the balance shafts, 31 and 32, are connected in torque transmitting relation with the crankshaft in order to provide a balancing feature for the engine 10.

Figure 2:
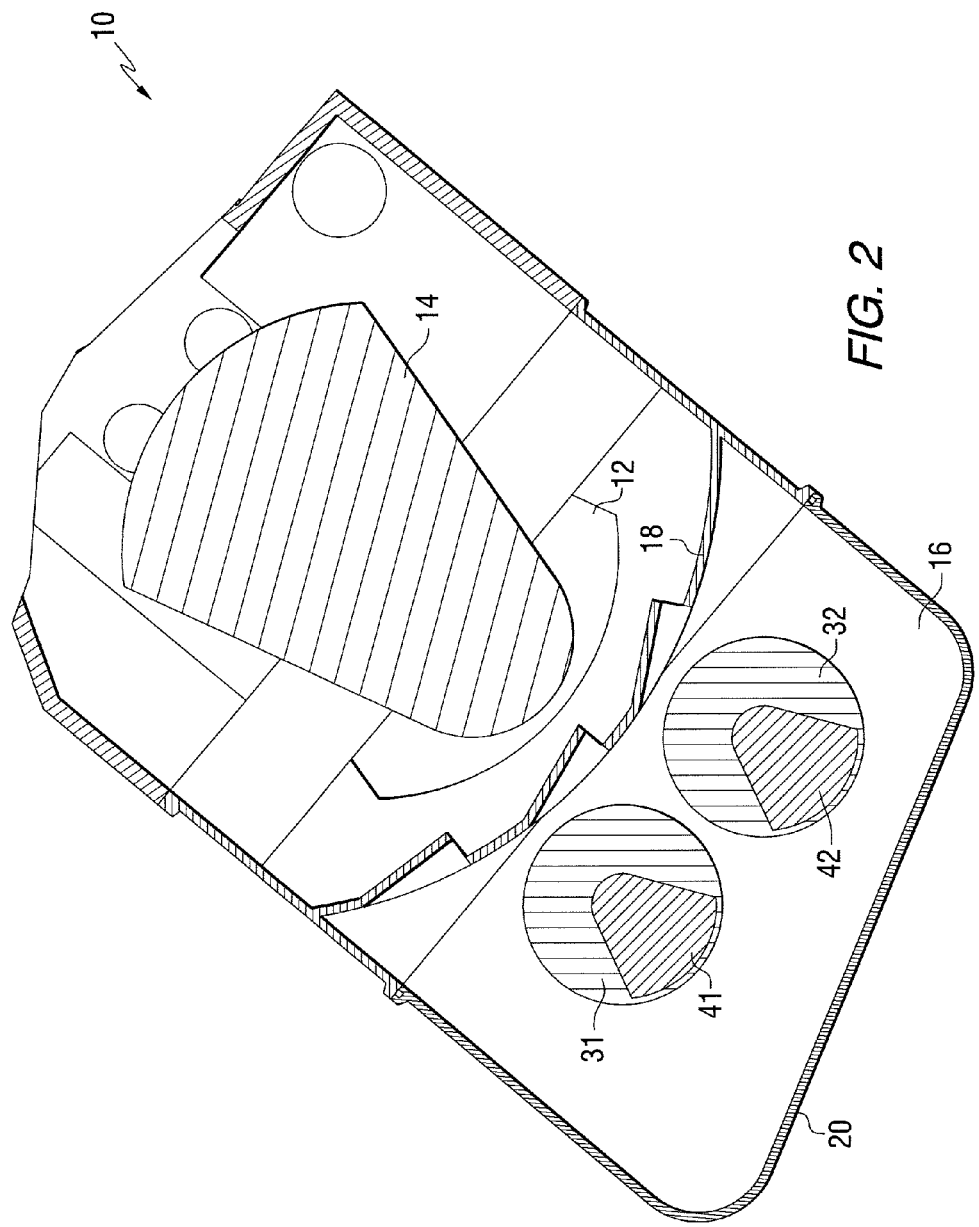

FIG. 2 is an alternative section view of the engine 10 showing the counterweights 41 and 42, of one particular embodiment of the present invention. FIG. 2 will be described in greater detail below in conjunction with FIG. 4.

FIG. 3 illustrates a balance shaft used in conjunction with an internal combustion engine. It comprises a shaft 50 and a pair of counterweights, 52 and 54. The counterweights are attached to the shaft 50 for rotation with the shaft about the axis of rotation 56. Each of the counterweights has an individual center of gravity which is displaced radially from the axis of rotation. As can be seen in FIG. 3, the shapes of the counterweights, 52 and 54, indicate that the center of gravity of the counterweights is above the axis 56 in FIG. 3. Also shown in FIG. 3 is a gear 60 which allows the balance shaft to be connected in torque transmitting relation with a gear associated with the crankshaft of the engine.

With continued reference to FIGS. 1-3, it should be understood that the counterweights of the balance shaft, in certain engines of the type described above, are disposed within the oil reservoir 16. When the balance shaft rotates about the axis of rotation 56, the irregular shape of the outer surface of the counterweights will stir the oil in a highly disadvantageous manner. Since the balance shaft rotates at a relatively high speed, the repeated turbulent and violent contact between the external surfaces of the counterweights and the pool of oil in the oil reservoir 16 will deleteriously aerate the liquid oil as it is stored awaiting its travel to regions of the engine 10 requiring lubrication. This circumstance is highly disadvantageous.

FIG. 4 shows the balance shaft described above in conjunction with FIG. 3, but with the counterweights encased in a polymer material that is overmolded around the external surface of the counterweights.

With reference to FIGS. 2 and 4, the section view in FIG. 2 illustrates the relative positions of the counterweights (identified by reference numerals 41 and 42 in FIG. 2) and their positions within the mass of polymer material. The overmolded polymer material in FIG. 2 is identified by reference numerals 31 and 32 for the two balance shafts and by reference numeral 31 in FIG. 4 for the illustrated balance shaft. With continued reference to FIGS. 2 and 4, it can be seen that the counterweights are completely surrounded by the polymer material (such as polyetheretherketone—PEEK). The resulting outer surface illustrated in FIG. 4 causes significantly less turbulence in the oil reservoir than the uncoated counterweights, 52 and 54, as illustrated in FIG. 3. The overmolded polymer material creates and defines a circumferential surface 68 which surrounds the counterweights and has a generally constant radius relative to the axis of rotation 56. These characteristics cooperate to significantly reduce the resulting turbulence in the oil reservoir as the balance shaft rotates about its axis of rotation.

Figure 5:
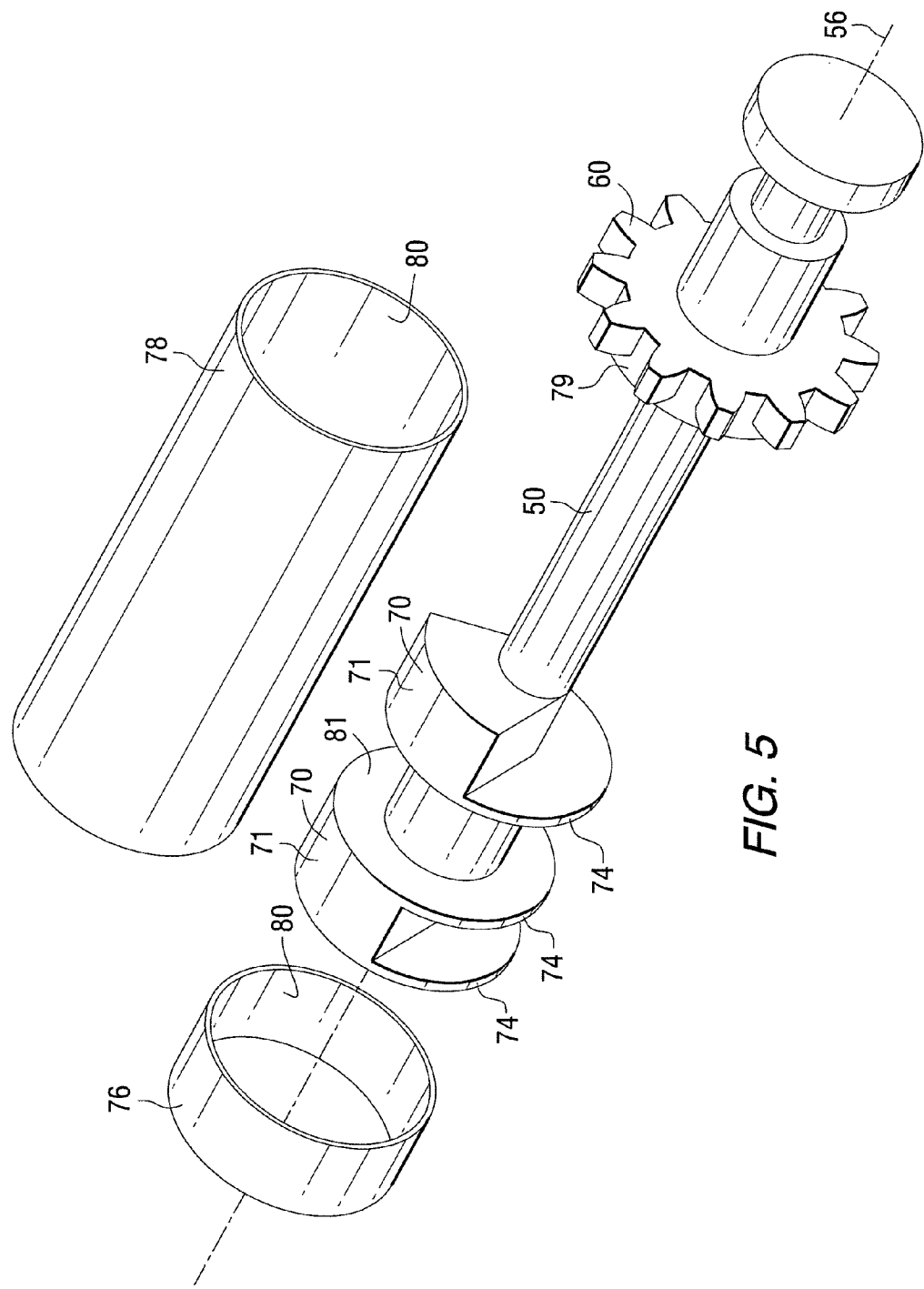
FIGS. 5 and 6 show an embodiment of the present invention that uses cylindrical casings to cover the counterweights of a balance shaft.

FIG. 5 shows an alternative embodiment of the present invention in which the counterweights 70 are provided with additional circumferential surfaces 74 that are sized to receive cylindrical casings, 76 and 78. The inside diameters 80 of the casings are attached to the circumferential surfaces 74 in order to allow them to cover the various discontinuous surfaces that would otherwise create turbulence in the oil reservoir. It can also be seen that a surface 79 formed as part of the gear 60 is also shaped to receive the inside surface 80 of the cylindrical casing 78. When the cylindrical casings are disposed at their intended positions of the balance shaft, the resulting configuration is that which is represented in FIG. 6.

Figure 6:
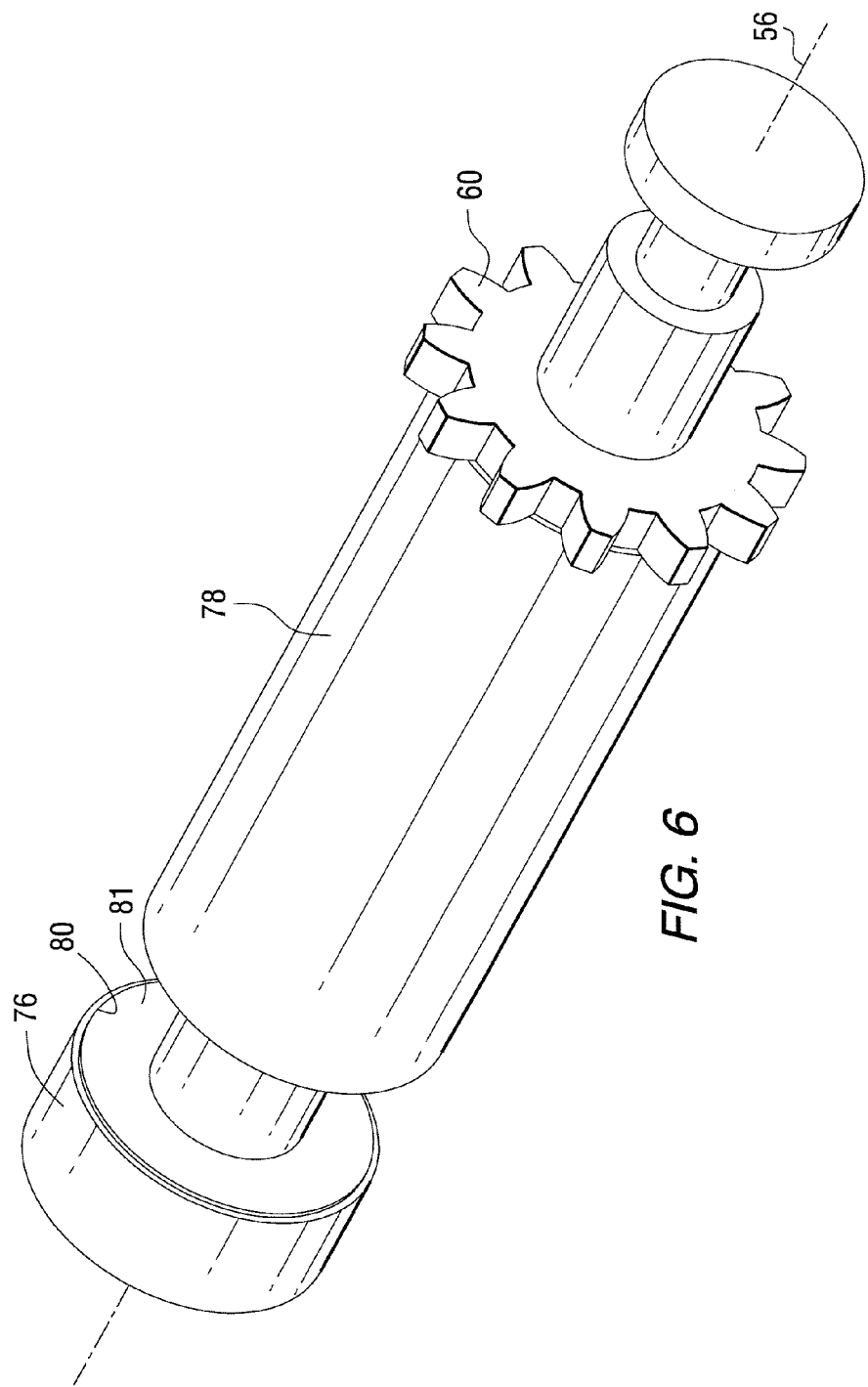

In FIG. 6, it can be seen that the cylindrical casings, 76 and 78, provide a cover that extends over the counterweight 70, as shown in FIG. 5, and the extended circumferential surfaces 74 which are purposely used to provide a more stable base for the attachment of the casing, 76 and 78.

Figure 7:
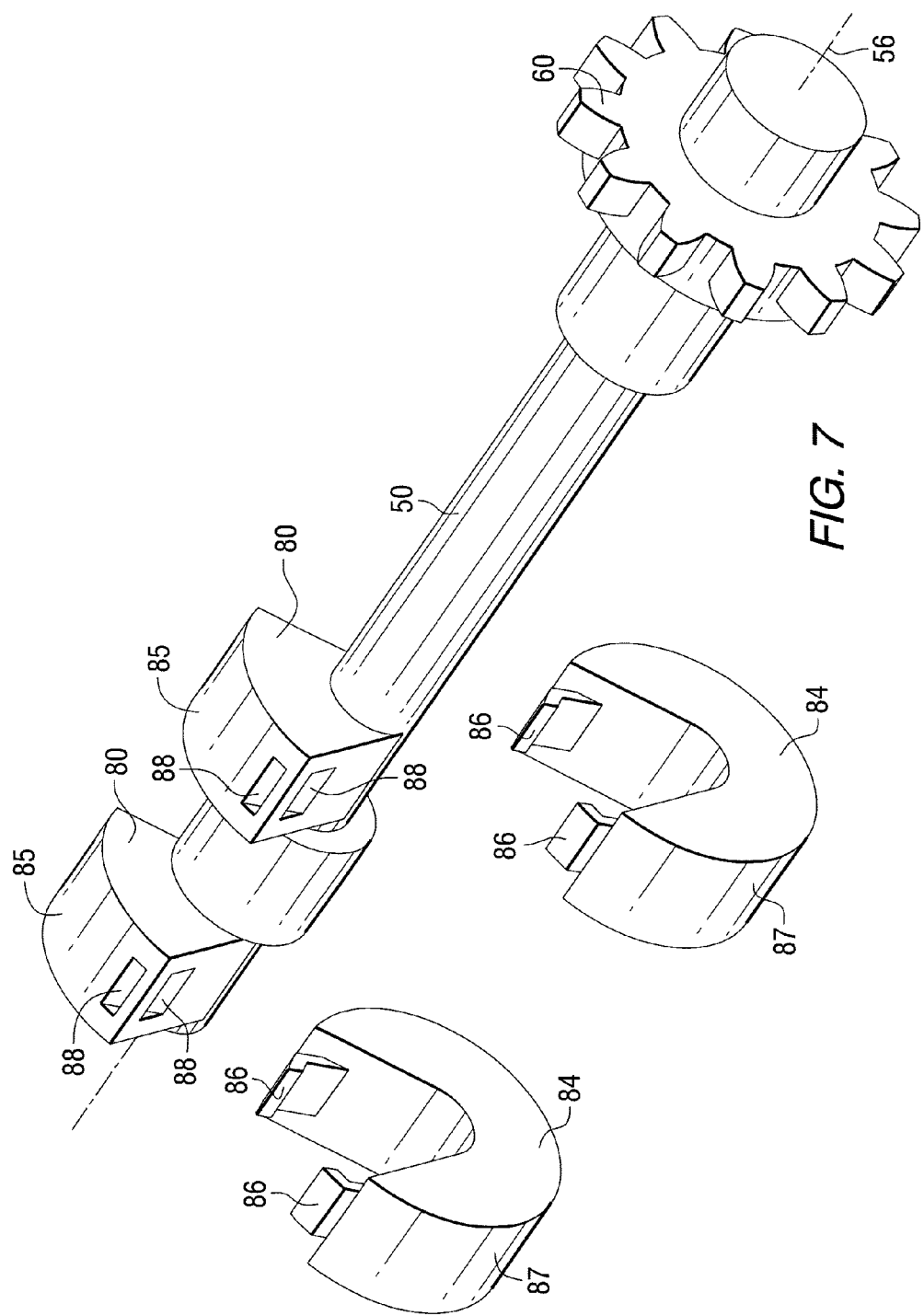
FIGS. 7 and 8 show an alternative embodiment of the present invention which attaches a partial disc shaped casing to the counterweights of a balance shaft in order to provide a generally full and complete disc shaped structure with no discontinuities that would otherwise create turbulence and aeration of oil in which the balance shafts are submerged.

FIG. 7 shows a balance shaft and two casings, 84 made in accordance with one of the alternative embodiments of the present invention. The casings 84 are made of a relatively light material, such as a polymer, so that they can fulfill the function of providing a relatively smooth outer surface without affecting the location of the center of gravity provided by the counterweights 80. In the embodiment shown in FIG. 7, the counterweight comprises a segment of a disc, approximately two-thirds of a complete disc, which is shaped to cooperate with the counterweight 80 to define a generally disc-shaped structure when the casing is combined with the counterweight as will be described below. The casing comprises tabs 86 which are shaped to be received in slots 88.

Figure 8:
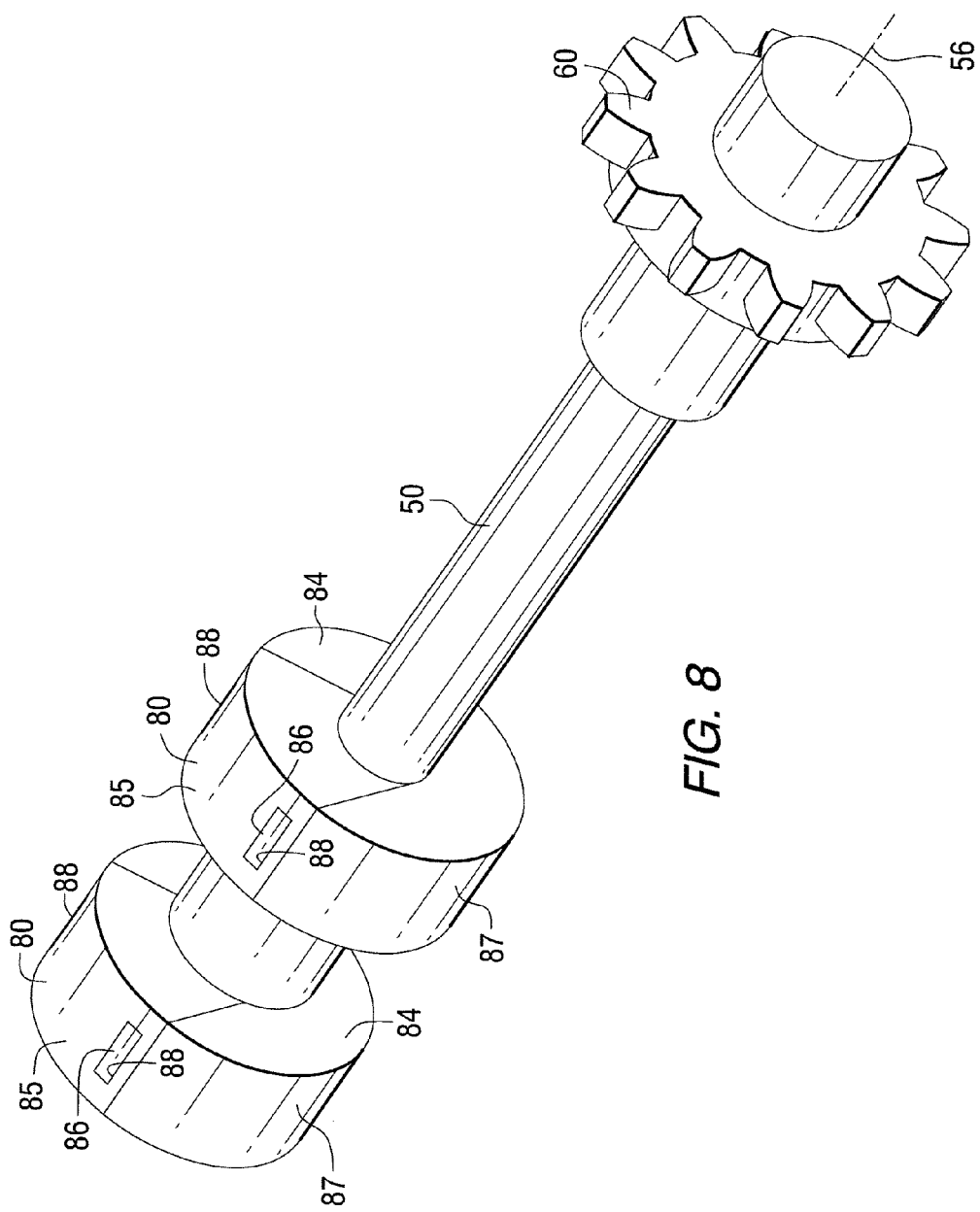

FIG. 8 shows the casings 84 assembled to the counterweights 80 with the tabs 86 disposed in the slots 88 to retain the casings in position as shown in FIG. 8. With the casings 84 in the position shown in FIG. 8, the outer surface of the combined structure of counterweight and casing is relatively smooth and provides a circumferential outer surface with a generally constant radius relative to the axis of rotation 56. This type of structure, as described above, significantly reduces the likelihood that rotation of the balance shaft will cause turbulent splashing of the oil in which the balance shaft is at least partially submerged.

Throughout the description of the various embodiments of the present invention, the term "casing" has been used along with the term "housing structure" to describe the components identified by reference numerals 31, 76, 78, and 84. A well-accepted definition of the term "casing" is "a cover or shell that protects or encloses something." Another definition of the word "casing" is "a container or cover that goes around something to hold it together or protect it." As used in the description of the various embodiments of the present invention, this word is used to describe a component that covers at least a portion of the counterweight in order to give the counterweight a smooth outer surface while covering discontinuities in that surface that would otherwise create turbulence and cause aeration when the counterweight is rotated with the balance shaft while being submerged or partially submerged in oil within the crankcase of an engine, as described above in conjunction with FIGS. 1 and 2. Although other terms may be available to describe this type of component, it should be understood that the casing of the present invention is intended to perform the function of covering discontinuous surfaces and presenting a generally continuous surface in contact with the oil as the balance shaft rotates. In most embodiments of the present invention, this exposed surface of the casing is generally cylindrical and has a generally constant radial distance from the axis of rotation of the balance shaft. Although non-cylindrical surfaces may also be able to accomplish these goals and be within the scope of the present invention, the most preferred embodiments of the present invention are generally similar in character to the embodiments described above in conjunction with FIGS. 3-8.

In the embodiment of the present invention described above in conjunction with FIGS. 3 and 4, the entire counterweight which extends from the shaft 50 is surrounded by a polymer overmolded material to create the smooth surfaces shown in FIG. 4. As illustrated in the section views of FIG. 2, the embodiment shown in FIG. 4 completely surrounds the counterweight which is identified by reference numerals 41 and 42 in FIG. 2 and by reference numerals 52 and 54 in FIG. 3. This causes both the circumferential surfaces 68 and axial surfaces 69 to comprise the polymer overmolded material. All of the other surfaces of the counterweights 54 extending away from the shaft 50 are covered by the casing 31.

The embodiment of the present invention described above in conjunction with FIGS. 5 and 6 differs slightly from the embodiment described in conjunction with FIGS. 3 and 4 in that the casing, 76 and 78, covers the radially outward surfaces of the counterweight 80, but not the axial faces. In other words, the circumferential surfaces 71 are covered by the casings, 76 and 78, but the axial faces 81 are not. However, the casings, 76 and 78, serve the important function of providing a smooth and continuous surface that is unlikely to cause aeration when the balance shaft rotates within the liquid oil pool. The provision of the circumferential mounting surfaces 74 also assure that the exposed axial faces of the counterweights are also relatively smooth and without protrusions or discontinuities that would otherwise aerate the oil.

The embodiment of the present invention described above in conjunction with FIGS. 7 and 8 provide a relatively smooth circumferential surface that, when the casing 84 is attached to the counterweight 80, comprises the surface 85 of the counterweights with surface 87 of the casings 84 to provide a completely circumferential surface without any major discontinuities that could aerate the oil as the balance shaft 50 rotates. The axial faces of the combined casings 84 and counterweights 80, as illustrated in FIG. 8, are also relatively flat without major discontinuities that could create turbulence in the oil pool.

With continued reference to FIGS. 1-8, it can be seen that a shaft of an engine made in accordance with a preferred embodiment of the present invention comprises a counterweight attached to the shaft for rotation with the shaft about an axis of rotation, wherein the counterweight has a center of gravity which is displaced radially from the axis of rotation. The present invention also comprises a casing disposed at least partially around the counterweight to define an outer surface surrounding the counterweight. The outer surface can comprise a generally circumferential surface which has a generally constant radius relative to the axis of rotation. The casing can comprise a polymer material which is overmolded on the counterweight. All surfaces of the counterweight in certain embodiments of the present invention, which are not directly in contact with the shaft, are completely encased within the polymer material. The casing, alternatively, can be a cylinder disposed in contact with a radially outward surface of the counterweight. The casing can also comprise a segment of a disc which is shaped to cooperate with the counterweight to define a generally disc shaped structure when the housing structure is combined with the counterweight. In that particular embodiment of the present invention, the casing can comprise a tab which is shaped to be received in a slot formed in the counterweight. In all embodiments of the present invention, the shaft can be a balance shaft which rotates in synchrony with a crankshaft of the engine. Alternatively, in some embodiments of the present invention, the shaft can be a crankshaft of the engine.

Figure 9:
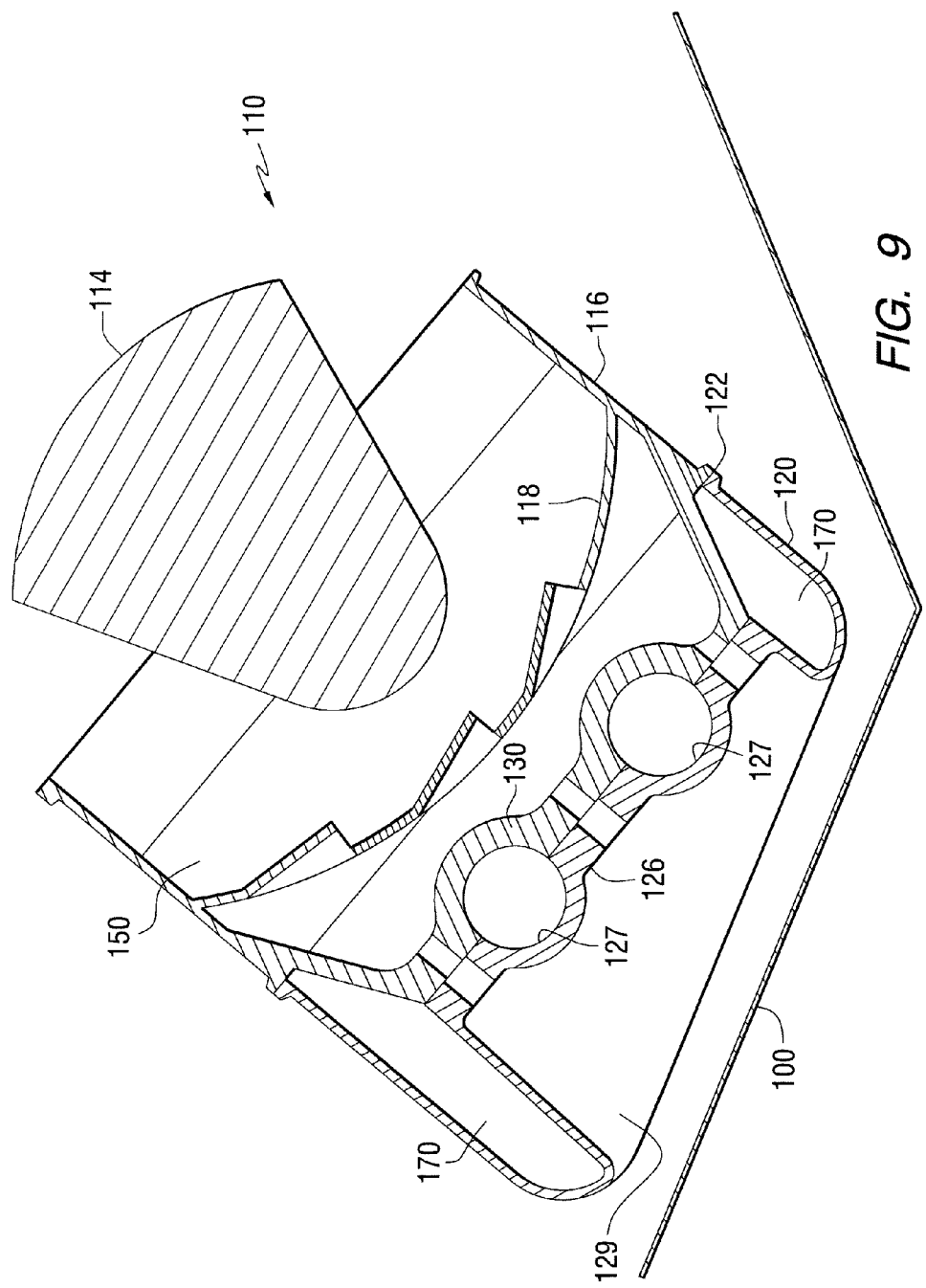
FIG. 9 is a section view showing an engine structure with balance shaft bearing supports formed as an integral part of a bedplate and a bearing cap formed as an integral part of an oil pan.

FIG. 9 is a schematic view of the present invention showing a boat hull 100 below an engine configuration 110. A crankshaft counterweight 114 shows the relative position of the crankshaft to the louvered surface 118 of a first housing, or bedplate 116. A second housing, or oil pan 120, is attached to the bedplate 116 at a parting line 122. In the embodiment shown in FIG. 9, a bearing cap 126 is formed as an integral part of the oil pan 120. A first support member, or balance shaft bearing support 130, is formed as an integral part of the bedplate 116.

Figure 10:
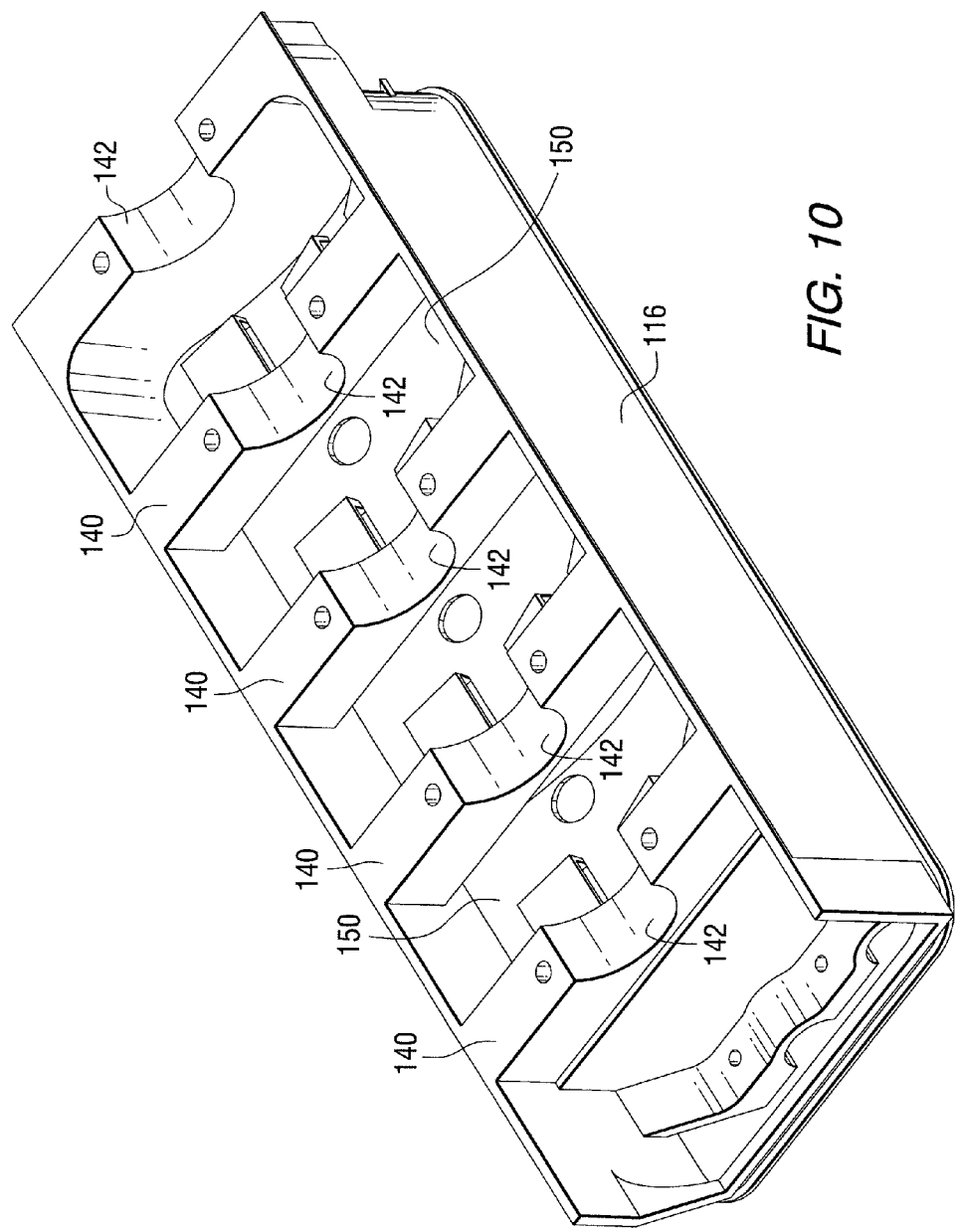
FIG. 10 is an isometric view of a bedplate in accordance with a preferred embodiment of the present invention.

FIG. 10 is an isometric representation of the bedplate 116. It has a plurality of crankshaft bearing supports which are shaped to define crankshaft journals 142. The crankshaft bearing supports 140 are formed as an integral part of the bedplate 116 and disposed within a first cavity 150 which is defined by the bedplate 116 and its attachment to the engine. The crankshaft journals 142 are shaped to support the crankshaft or bearings which, in turn, support the crankshaft.

Figure 11:
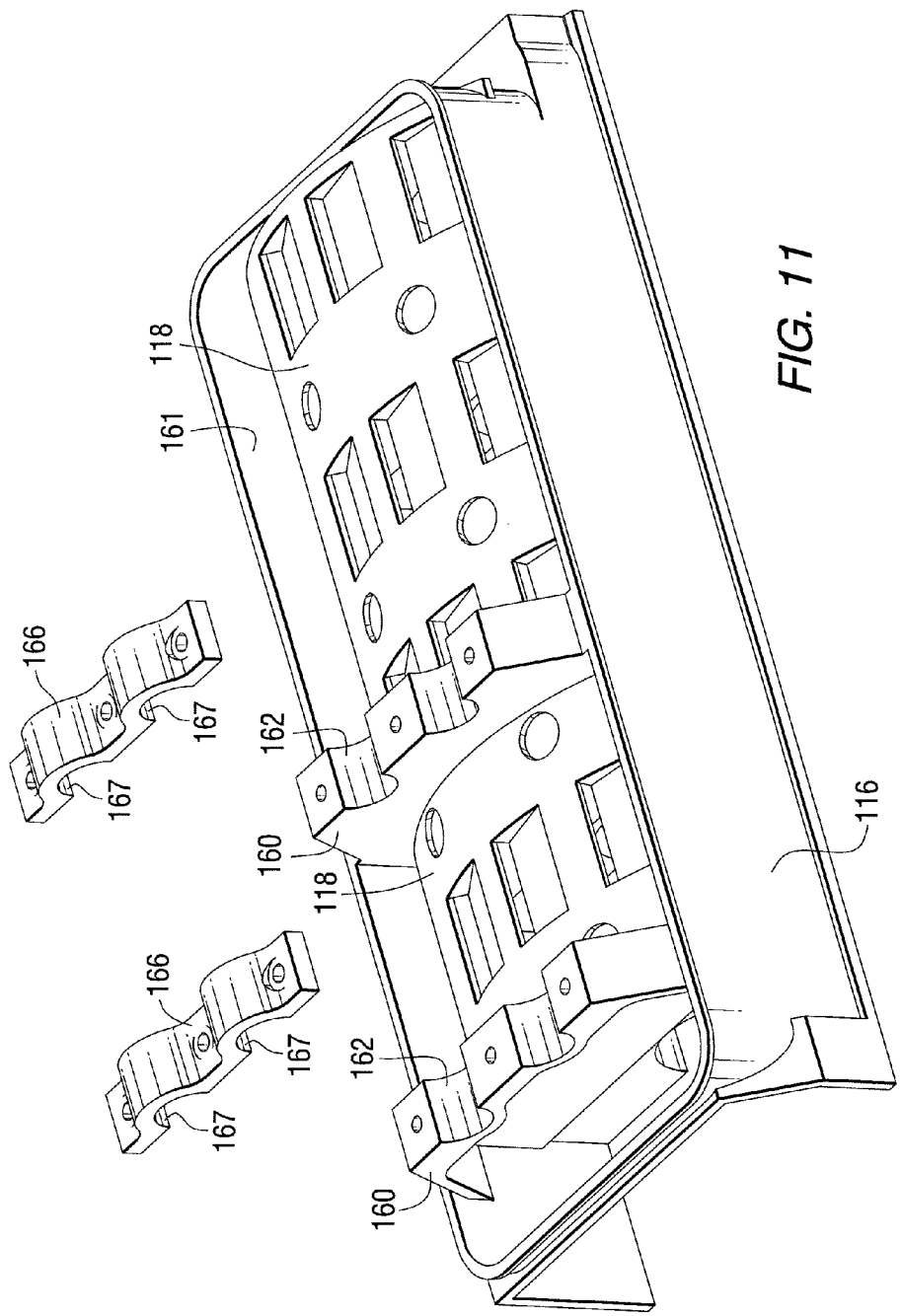
FIG. 11 shows a bottom view of the bedplate in FIG. 10 in combination with bearing caps that are formed as separated components from an oil pan.

FIG. 11 is an isometric view showing the bottom of the bedplate 116 which is described above in conjunction with FIG. 10. Balance shaft bearing supports 160 are shaped to define balance shaft journals 162. The balance shaft journals 162 are shaped to receive the balance shafts or bearings which support the balance shafts. In a preferred embodiment of the present invention, the balance shaft bearing supports 160 are formed as an integral part of the bedplate 116.

With continued reference to FIGS. 9-11, the function of the bearing cap 126 described above in conjunction with FIG. 9, can be provided by bearing caps 166 shown in FIG. 11. Depending on the embodiment of the present invention, the bearing cap 126 can be an integral part of the oil pan 120 or a separate component 166 that is attachable to the balance shaft bearing supports 160. Depending on the application, alternative embodiments of the present invention can use either separate bearing caps 166 or integral bearing caps 126.

Figure 12:
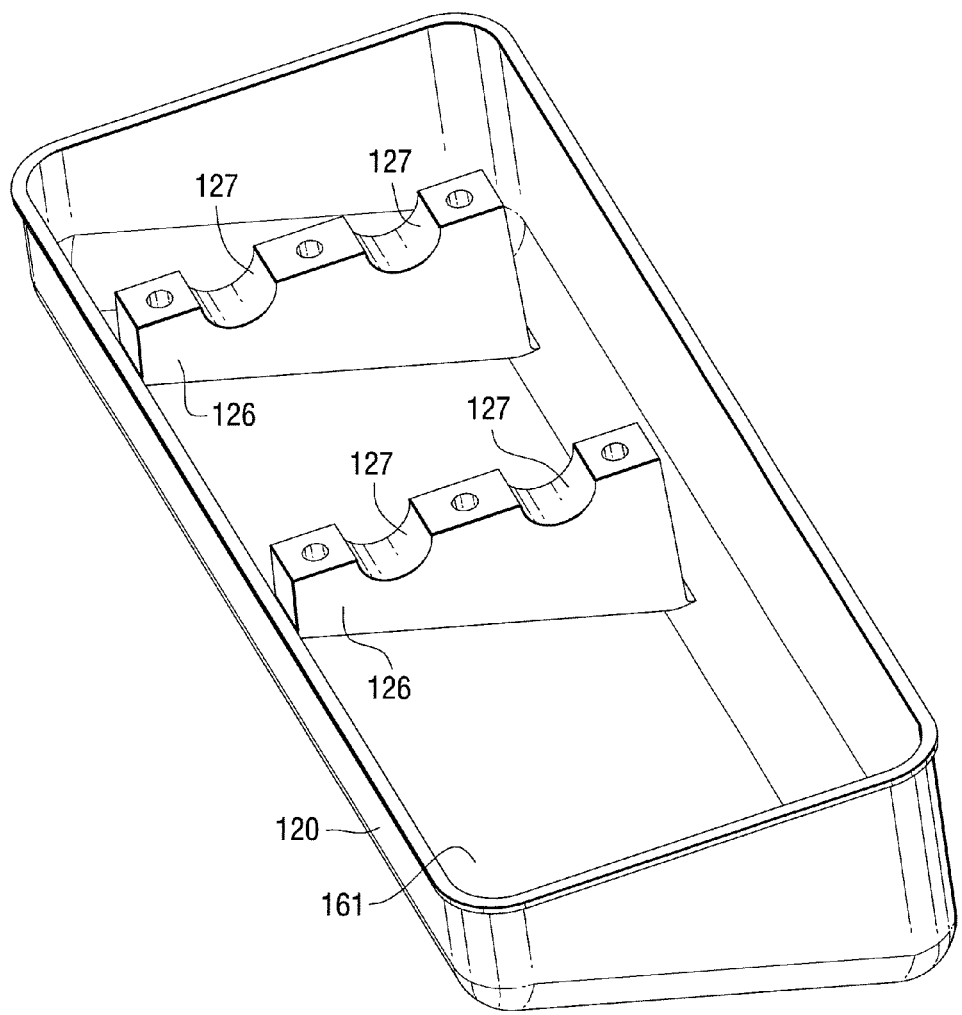
FIG. 12 shows an oil pan with integrally formed bearing caps according to one alternative embodiment of the present invention.

FIG. 12 is an isometric view of the oil pan 120 showing the integral bearing caps 126 which are shaped to provide balance shaft journals 127. With reference to FIGS. 9 and 12, it can be seen that this embodiment of the present invention provides integral bearing caps 126 that are formed as an integral portion of the oil pan 120 and it can also be seen that the integral bearing caps 126 are hollow with a cavity 129 formed within its structure. This cavity 129 significantly reduces the weight of the overall oil pan 120.

With reference to FIGS. 9-12, it can be seen that the separate oil caps 166 are provided with balance shaft journals 167 that cooperate with bearing shaft journals 166 of the balance shaft bearing supports 160 to confine the balance shafts, or associated bearings, and support the balance shafts for rotation about their respective axes, 35 and 36, as described above in conjunction with FIG. 1.

With continued reference to FIGS. 9-12, it can be seen that the provision of integral balance shaft bearing supports 160 can significantly reduce the overall weight and complexity of the structure. Since they are integral to the bedplate 116, no additional hardware is required to attach them to the bedplate. This, in itself, significantly reduces the complexity and assembly time of the structure. In addition, integral balance shaft bearing supports 160 can be made hollow and do not need the additional protrusions or extensions that would typically be necessary to permit them to be attached to the bedplate 116 through the use of additional hardware, such as bolts or screws. Although certain embodiments of the present invention can utilize separate bearing caps 166, the use of integral bearing caps 126 provide these additional advantages of not requiring fastening hardware and allowing cavities 126 to be formed to reduce the overall weight of the structure. The integral bearing caps 126 also allow spaces, such as those identified by reference numeral 170, which further reduce the overall weight of the structure.

With continued reference to FIGS. 9-12, it can be seen that preferred embodiments of the present invention comprise a bedplate 116 which is attached to an engine 110 to define a first cavity 150, a crankshaft 114 of the engine 110 disposed within the first cavity 150, an oil pan 120 attached to the bedplate 116 to define a second cavity 161, a balance shaft bearing support 160 formed as an integral part of the bedplate 116 and first and second balance shafts, 31 and 32, disposed within the second cavity 161 and supported by the balance shaft bearing supports 160 for rotation about their first and second axes, 35 and 36. The bearing caps can be integral to the oil pan 120, such as bearing cap 126, or separate from the oil pan 120 such as bearing cap 166.

Although the present invention has been described in particular detail and illustrated to show a preferred embodiment, it should be understood that alternative embodiments are also within its scope.

We claim:
1. An internal combustion engine, comprising:
a first housing attached to said engine to define a first cavity;
a crankshaft of said engine disposed within said first cavity;
a second housing attached to said first housing to define a second cavity;
a first support member formed as an integral part of said first housing; and
a first balance shaft disposed within said second cavity and supported by said first support member for rotation about a first axis.
2. The engine of claim 1, further comprising:
a bearing cap which is attachable to said first support member to capture a portion of said first balance shaft therebetween.
3. The engine of claim 2, further comprising:
a second balance shaft disposed within said second cavity and supported by said first support member for rotation about a second axis.
4. The engine of claim 3, wherein:
said first and second axes are generally horizontal.
5. The engine of claim 3, wherein:
said bearing cap is formed as an integral part of said second housing and is attachable to said first support member.
6. The engine of claim 3, wherein:
said bearing cap is a component which is separate from said second housing and is attachable to said first support member.

7. The engine of claim 1, wherein:
said first housing comprises a louvered surface to permit fluid communication between said first and second cavities through said louvered surface.

8. The engine of claim 1, wherein:
said second housing is shaped to define a reservoir configured to contain liquid lubricant.

9. The engine of claim 1, further comprising:
a crankshaft support member formed as an integral part of said first housing and disposed within said first cavity, said crankshaft being supported by said crankshaft support member.

10. The engine of claim 1, wherein:
said second housing is suspended below said first housing.

11. An internal combustion engine, comprising:
a bed plate attached to said engine to enclose a first cavity;
a crankshaft of said engine disposed within said first cavity;
an oil pan attached to said bed plate to enclose a second cavity;
a balance shaft bearing support formed as an integral part of said bed plate;
a first balance shaft disposed within said second cavity and supported by said balance shaft bearing support for rotation about a first axis; and
a bearing cap which is attachable to said balance shaft bearing support to capture a portion of said first balance shaft therebetween.

12. The engine of claim 11, further comprising:
a second balance shaft disposed within said second cavity and supported by said balance shaft bearing support for rotation about a second axis, said first and second axes being generally horizontal, said oil pan being suspended below said bed plate.

13. The engine of claim 11, wherein:
said bearing cap is formed as an integral part of said oil pan and is attachable to said balance shaft bearing support.

14. The engine of claim 11, wherein:
said bearing cap is a component which is separate from said oil pan and is attachable to said balance shaft bearing support.

15. The engine of claim 11, wherein:
said bed plate comprises a louvered surface to permit fluid communication between said first and second cavities through said louvered surface, said oil pan being shaped to define a reservoir configured to contain liquid lubricant.

16. The engine of claim 11, further comprising:
a crankshaft bearing support formed as an integral part of said bed plate and disposed within said first cavity, said crankshaft being supported by said crankshaft bearing support.

17. An internal combustion engine, comprising:
a bed plate attached to said engine to define a first cavity;
a crankshaft of said engine disposed within said first cavity;
a oil pan attached to said bed plate to define a second cavity, said oil pan being shaped to define a reservoir configured to contain liquid lubricant, said oil pan being suspended below said bed plate;
a balance shaft bearing support formed as an integral part of said bed plate;
a first balance shaft disposed within said second cavity and supported by said balance shaft bearing support for rotation about a first axis;
a second balance shaft disposed within said second cavity and supported by said balance shaft bearing support for rotation about a second axis, said first and second axes being generally horizontal; and
a bearing cap which is attachable to said balance shaft bearing support to capture portions of said first and second balance shafts therebetween.

18. The engine of claim 17, wherein:
said bearing cap is formed as an integral part of said oil pan and is attachable to said balance shaft bearing support.

19. The engine of claim 17, wherein:
said bearing cap is a component which is separate from said oil pan and is attachable to said balance shaft bearing support.

20. The engine of claim 17, further comprising:
a crankshaft bearing support formed as an integral part of said bed plate and disposed within said first cavity, said crankshaft being supported by said crankshaft bearing support.

* * * * *